United States Patent
Kelley et al.

(10) Patent No.: US 7,240,841 B2
(45) Date of Patent: Jul. 10, 2007

(54) CREATING AND USING DOCUMENTS WITH MACHINE-READABLE CODES

(75) Inventors: Yohko A. Kelley, Redmond, WA (US); Kenneth E. Feuerman, Fremont, CA (US); James Lester, Dublin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 163 days.

(21) Appl. No.: 10/868,693

(22) Filed: Jun. 15, 2004

(65) Prior Publication Data

US 2005/0224572 A1    Oct. 13, 2005

Related U.S. Application Data

(60) Provisional application No. 60/561,223, filed on Apr. 8, 2004.

(51) Int. Cl.
*G06K 7/10* (2006.01)

(52) U.S. Cl. .................. 235/462.01; 235/376; 235/494; 235/462.15

(58) Field of Classification Search ................ 235/375, 235/376, 462.15; 902/4
See application file for complete search history.

(56) References Cited

U.S. PATENT DOCUMENTS

| | | | |
|---|---|---|---|
| 5,060,980 A | 10/1991 | Johnson et al. | |
| 5,486,686 A | 1/1996 | Zdybel, Jr. et al. | |
| 5,825,006 A | 10/1998 | Longacre et al. | |
| 6,540,142 B1 * | 4/2003 | Alleshouse | ............ 235/462.01 |
| 6,624,826 B1 | 9/2003 | Balabanovic | |
| 6,764,009 B2 * | 7/2004 | Melick et al. | ......... 235/462.01 |
| 6,823,075 B2 | 11/2004 | Perry | |
| 6,882,737 B2 | 4/2005 | Lofgren et al. | |
| 2004/0153968 A1 | 8/2004 | Ching, et al. | |
| 2005/0061890 A1 | 3/2005 | Hinckley | |

OTHER PUBLICATIONS

Barnes, et al. "Two Dimensional Bar Coding", Purdue University, Tech 621, Spring, 1999 pp. 1-46.
Harvey Spencer Associates, Inc. "Forms Capture and Forms Processing", http://www.hsassocs.com/products/forms_capture.html, 2001, last updated Oct. 16, 2002, 3 pages.

(Continued)

*Primary Examiner*—Seung Ho Lee
(74) *Attorney, Agent, or Firm*—Fish & Richardson P.C.

(57) ABSTRACT

Methods and apparatus, including computer systems and program products, for creating and using documents with machine-readable codes. A computer program displays a list of fields in an electronic document, receives user input selecting one or more of the fields, automatically generates generation instructions for a machine-readable code to be displayed in a final appearance of the electronic document, and stores the generation instructions in the electronic document. The generation instructions specify that the machine-readable code is to be produced using data to be provided for the selected fields. In some embodiments, the program can also evaluate the user input, as well as user modifications made to the electronic document, to determine whether the machine-readable code is validly configured. By guiding users through the process of setting up machine-readable codes, the program can help users create forms with machine-readable codes that have a high probability of being scanned and decoded successfully.

34 Claims, 7 Drawing Sheets

OTHER PUBLICATIONS

Harvey Spencer Assocates, Inc. "Standard to Encode Data on Forms", http://www.hsassocs.com/prelim%20encode%20std.pdf, downloaded from the Internet on Jul. 23, 2003 (undated), 9 pages.

Captiva Software Corporation "Products>FormWare>FormWare Enterprise, Features", http://www.captivasoftware.com/products/formware6.asp, 2002, 2 pages.

Captiva Software Corporation "Products>FormWare>FormWare Enterprise, Universal Information Capture Software", http://www.captivasoftware.com/products/formware1.asp, 2002, 2 pages.

Captiva Software Corporation "Products>FormWare>FormWare Enterprise, Powerful Features", http://www.captivasoftware.com/products/formware2.asp, 2002, 2 pages.

Captiva Software Corporation "Products>FormWare>FormWare Enterprise, Easy Setup and Administration", http://www.captivasoftware.com/products/formware3.asp, 2002, 2 pages.

Captiva Software Corporation "Products>FormWare>FormWare Enterprise, Distributed Process", http://www.captivasoftware.com/products/rformware4.asp, 2002, 2 pages.

Captiva Software Corporation "Products>FormWare>FormWare Enterprise, Solutions for your Industry", http://www.captivasoftware.com/products/formware5.asp, 2002, 2 pages.

Systems Imaging, Inc. "I. Data Capture, OCR, Forms Design & Processing", http://www.sysimaging.com/datacapture.htm, 2002, 4 pages.

"ScanSoft Capture Development System 12 Adds Asian OCR, Combines Superior Accuracy and Speed with PDF and XML", Business Wire, No. 5461, Apr. 7, 2003, 5 pages.

ScanSoft, Inc. "Home>Products>Capture Development System, Key Features", http://www.scansoft.com/capturesdk/features.asp, 2003, 2 pages.

ScanSoft, Inc. "ScanSoft Capture Development System 12 Adds Asian OCR, Combines Superior Accuracy and Speed with PDF and XML", http://www.scansoft.com/news/pressreleases/2003/20030407_capture.asp, Apr. 07, 2003, 5 pages.

ScanSoft, Inc. "Home>Products>Capture Development System, Product Overview", http://www.scansoft.com/capturesdk/overview.asp, 2003, 4 pages.

ScanSoft, Inc. "Home>Products>Capture Development System, Integrated PDF Toolkit", http://www.scansoft.com/capturesdk/overview.asp. 2003, 4 pages.

Image Access, "The Performance Scan Station for Stand Alone and Network Environments", http://www.imageaccess.de/ger/bscan-standard.html, 1999, last updated Jun. 15, 2000, 7 pages.

"Cardiff's Liquid Office™ eForm Management System Selected by the City of Boston to Replace its Manual Form Processes", PR Newswire, No. LAM04213052002, May 13, 2002, 3 pages.

Global Data Solutions, "Can Your Company Use Formatta eForms?", downloaded from the Internet Aug. 2003 (undated), 2 pages.

DCS, "What is Data Capture?", http://www.dsc-va.com/page30.html, downloaded from the Internet Sep. 2003 (undated), 3 pages.

AnyDoc Software, Inc. "The Solution for Capturing all the Vital Data and Images from Your Documents", http://www.mti-info.com/Products/OCRforAnyDoc/main.asp, downloaded from the Internet Aug. 2003, (undated), 2 pages.

ReadSoft AB, "Forms5 Product Overview", 2002, pp. 1-30.

"Input Software: Intial Three Products Attain InputAccel Certification to Solve Data Capture Requirements", Business Wire, Oct. 22, 1998, 3 pages.

Cardiff Software, Inc. "Information Capture System", 1991-2002, 10 pages.

Seward Consulting, Inc. "Products, Forms Processing", http://www.sewardconsulting,com/Imaging/products_datacapture.htm, downloaded from the Internet Sep. 2003, (undated), 10 pages.

IBM Corporation, "IBM Intelligent forms Processing Services Offering", downloaded from the Internet Aug. 2003, (undated), 8 pages.

CNET Networks, Inc. "Kofax Ascent Capture v5.51", http://www.zdnet.com.au/reviews/software/business/story/0.2000023555.20270277-3.00.htm, 2003, 5 pages.

IBM Corporation, "how IFP works>Data Capture, Scan & Import", http://www2.clearlake.ibm.com/GOV/ifp/data_capture.html, downloaded from the Internet Oct., 2003 (undated), 1 page.

IBM Corporation, "how IFP works>Data Verification", http://www2.clearlake.ibm.com/GOV/ifp/data_validation.html, downloaded from the Internet Oct., 2003 (undated), 2 pages.

IBM Corporation, "IPF functions", http://www2.clearlake.ibm.com/GOV/ifp/how_works.html, downloaded from the Internet Oct., 2003 (undated), 1 page.

IBM Corporation, "Systems Services", http://www2.clearlake.ibm.com/GOV/ifp/system_services.html, downloaded from the Internet Oct., 2003 (undated), 1 page.

IBM Corporation, "how IFP works>Data Output", http://www2.clearlake,ibm.com/GOV/ifp/data_output.html, downloaded from the Internet Oct., 2003, (undated), 1 page.

Arch Data Systems, Inc. "Generating Real Business Value with Teleform" http://www.cdstorage.com/imagingsolutions/Cardiff_Software.htm, ©1998-2000, last updated Nov. 07, 2002, 2 pages.

Information Access Systems, Inc. "How Does Automated Data Entry Work?" http://www.iasinc.net/formsprocessing/e-capture-works.htm, downloaded from the Internet Sep. 5, 2003 (undated), 4 pages.

TMS, Inc. "TMSSequoia and the 2000 Census", http://www.tmsinc.com/solutions/ff_at_work.html, ©1999-2002, 4 pages.

CNET Networks, Inc. "Canon imageReal Capture v3", http://www.zdnet.com.au/reviews/software/business/story/0.2000023555.20270277-2.00.htm, ©2003, 3 pages.

Free Form Recognition, Inc. "Prosar-Aida", http://www.freeformrecognition.com/vi.htm, ©2002, last updated Aug. 13, 2002, 2 pages.

Paradatec GmbH, "Prosar-Aida: Al-Based Document Analysis", Jan. 2002, 3 pages.

Kanai, et a. "Automated Evaluation of OCR Zoning", IEEE Transactions on Pattern Analysis and Machine Intelligence, vol. 17, No. 1, Jan. 1995, pp. 86-90.

D.E. Levine, "Not Your Sun's Microsystems", WinPlanet.com, http://www.winplanet.com/winplanet/reports/3281/1/, Apr. 27, 2001, 2 pages.

Tal Technologies, "High Resolution Graphics" Downloaded from the Internet on Oct. 11, 2006, at http://www.taltech.com/products/dll_barcodes.html, 2 pages.

"ultraforms 2-D Barcodes for PDF Forms ", Dataintro Software, retrieved from the internet at http://www.dataintro.com on Apr. 28, 2005, 4 pages.

"Barcode Recognition Software", Barcode recognition from raster image, Data Matrix, QR Code, Linear Barcodes, retrieved from the internet at http://www.axtel.com, on May 02, 2005, 20 pages.

"Create New Advantage. Symbol. The Enterprise Mobility Company", retrieved from the internet at file://C:DOCUMe~1/rpi/LO-CALS~1/Temp/7RRE890T.htm on May. 02, 2005, 236 pages.

* cited by examiner

CREATING AND USING DOCUMENTS WITH MACHINE-READABLE CODES

CROSS-REFERENCE TO RELATED APPLICATION

This application claims priority to U.S. Provisional Application No. 60/561,223, entitled CREATING AND USING DOCUMENTS WITH MACHINE-READABLE CODES, which was filed on Apr. 8, 2004. The disclosure of the above application is incorporated herein by reference in its entirety.

BACKGROUND

The present application relates to digital data processing.

Machine-readable codes are physical codes that encode data in a manner that enables the data to be read quickly and accurately by a machine. Examples of machine-readable codes include bar codes and radio frequency identification (RFID) tags.

A machine-readable code is produced by encoding input data according to a symbology or encoding scheme, and then generating a physical code (i.e., a physical representation of the encoded data). The generation of a physical code can be accomplished through many different types of processes (e.g., printing the code on a substrate such as a piece of paper), and generally represents a transition of the input data from an electronic environment to a tangible environment (e.g., a paper environment). As a further example of the different processes that can be used to generate a machine-readable code, the printing process itself can involve many different types of sub-processes. For example, printing a machine-readable code can involve printing in the traditional sense of depositing ink on paper (e.g., to create a pattern of light and dark elements in a bar code). As another example, printing a machine-readable code can involve depositing conductive, semi-conductive, or non-conductive chemicals or other materials on paper or on other substrates (e.g., to create a circuit pattern in an RFID tag).

A bar code is a common example of a machine-readable code. A bar code is typically made up of a pattern of dark elements (e.g., bars) and light elements (e.g., spaces between the bars). In traditional or "linear" bar codes, the dark elements are usually vertical bars of varying width or height (hence the "bar code" terminology). In newer, two-dimensional bar codes, the dark elements can be squares, rectangles, hexagons, or other two-dimensional shapes arranged in two-dimensional patterns.

A bar code can include a clear margin or "quiet zone" around the bar code, a finder pattern to help identify the location and/or the ends of the bar code, a pattern of light and dark elements that represents the data encoded in the bar code, and a pattern of light and dark elements that represents one or more encoded values used for purposes of error detection and correction (e.g., checksum values). A finder pattern can be, for example, a start or stop pattern placed at the leading or trailing edge of a bar code, a bulls-eye pattern placed in the middle of a two-dimensional bar code, or some other predefined pattern placed around the perimeter of a two-dimensional bar code.

A bar code reader such as a pen reader or a laser scanner typically decodes a bar code by scanning a light source across the bar code and measuring the intensity of light reflected back from the bar code. Light is reflected from the bar code in a pattern that mirrors the arrangement of the dark and light elements. A photodiode can be used to convert the pattern of reflected light into an electrical signal, and the electrical signal can be decoded back to the original data by comparing the electrical signal to patterns of light and dark elements defined in a bar code symbology.

A symbology is an encoding scheme for a machine-readable code. Most symbologies were created to meet the needs of specific industries, and as such, they are designed to encode different types and amounts of data. Examples of traditional, linear bar code symbologies include the UPC-A and Code 39 symbologies. UPC-A (Universal Product Code-A) is a symbology that is used to identify retail products. A UPC-A bar code can encode up to 12 numeric digits—a leading digit that usually represents a product type, a 10-digit UPC (Universal Product Code) assigned to the product by the Uniform Code Council, Inc., and a one digit checksum value. Code 39 is a variable length symbology that can encode 44 different characters—that is, a Code 39 bar code can encode messages of different lengths (typically up to 40 characters) that are made up of the 44 allowed characters, which include numeric digits and capital letters. As an encoding example in the Code 39 symbology, the pattern "wide bar, narrow space, narrow bar, narrow space, narrow bar, wide space, narrow bar, narrow space, wide bar" is used to encode the character "A".

Examples of two-dimensional bar code symbologies include MaxiCode, Data Matrix, Aztec Code, and PDF417 (Portable Data File 417). MaxiCode is a symbology that was developed by United Parcel Service, Inc., for purposes of package identification and tracking. MaxiCode bar codes are fixed size matrixes that can represent up to 138 numeric digits or up to 93 alphanumeric characters. Data Matrix, Aztec Code, and PDF417 are high density symbologies that can generally encode several thousand bytes of any type of data (including alphanumeric characters and binary data) in a single bar code.

Although two-dimensional bar codes can encode large amounts of data, two-dimensional symbologies can be complex and difficult to use. For example, the PDF417 symbology specifies that a complete PDF417 bar code symbol is to be produced by stacking codewords on top of each other. Specifically, each PDF417 bar code is to include at least three rows, where each row is made up of a start pattern, up to 30 codewords, and a stop pattern. Each codeword must consist of a pattern of 4 bars and 4 spaces, and must be 17 modules wide. (A "module" is the narrowest allowed width of a bar or space, and each bar or space can be up to six modules wide.)

Moreover, the complete PDF417 specification, developed by Symbol Technologies, Inc., provides many user encoding options: A user can specify the module width, the height of the rows, the aspect (height to width) ratio of a complete PDF417 symbol, the level of data compaction (which allows more than one character to be encoded in a single codeword), and the level of error detection and correction (which allows undecodable or corrupted portions of a symbol to be reconstructed) that are to be used in the creation of a PDF417 symbol.

As a further example of the complexity of the PDF417 symbology, the current PDF417 specification allows the user to select one of nine different levels of error detection and correction. Higher levels allow more codewords to be recovered if the codewords are either un-scannable or mis-scanned, but they require more overhead per bar code symbol. The appropriate level of error detection and correction to use depends on various factors that can affect the legibility of a bar code, including the print contrast between the light and dark elements, the sharpness of the edges of the dark elements, the frequency and size of spots in light elements and voids in dark elements, the ability to produce elements whose dimensions are within allowed tolerances, the clarity of the quiet zones around a bar code, and the smoothness of the surface on which a bar code is located.

SUMMARY

The present invention provides methods and apparatus, including computer program products, that implement techniques for creating and using documents with machine-readable codes.

In one general aspect, the techniques feature a computer program product with instructions operable to display a list of fields from an electronic document, receive user input with a selection of one or more selected fields from the list of fields, and automatically generate generation instructions for a machine-readable code to be displayed in a final appearance of the electronic document. The generation instructions specify that the machine-readable code is to be produced using data to be provided for the selected fields. The program instructions are further operable to store the generation instructions in the electronic document.

Advantageous implementations can include one or more of the following features. The generation instructions can include a script that is operable to assemble the data to be provided for the selected fields. The script can be further operable to generate metadata that provides a self-contained description of the data to be provided for the selected fields.

The user input can include one or more parameters for the machine-readable code, and the generation instructions can further specify that the machine-readable code is to be produced according to those parameters. The parameters for the machine-readable code can include one or more of a symbology, a decode condition, and an indication of whether the data to be provided for the selected fields is to be compressed before being encoded into the machine-readable code.

The program instructions can be further operable to compute a setting for a property of the machine-readable code based on the user input. The property for the machine-readable code can be an element size or an overall size for the machine-readable code.

The program instructions can also be operable to determine whether the user input produces a valid configuration for the machine-readable code. Determining whether the user input produces a valid configuration for the machine-readable code can include calculating a total data amount associated with the selected fields based on metadata describing the selected fields, and determining whether the total data amount exceeds a maximum data amount associated with the machine-readable code. The metadata describing the selected fields can include a field length associated with each selected field. The program instructions can also be operable to display a comparison of the total data amount and the maximum data amount. In addition, the program instructions can be operable to display an error indication if the user input does not produce a valid configuration for the machine-readable code.

The program instructions can be operable to display an appearance of the electronic document, and to display a first area within the appearance of the electronic document, the first area indicating a location where the machine-readable code is to be displayed. A minimum size can be associated with the first area. The user input can include one or more parameters for the machine-readable code, and the minimum size can be based on one or more of those parameters. The minimum size can include a boundary area around the machine-readable code that is to be produced.

In another aspect, the techniques feature a computer program product with instructions operable to receive an electronic document that contains a set of fields, generation instructions for a machine-readable code to be displayed in a final appearance of the electronic document, and a first area for displaying the machine-readable code to be produced. The generation instructions specify that the machine-readable code is to be produced using data to be provided for one or more selected fields from the set of fields. The program instructions are further operable to receive a specification of a first modification to the electronic document, and to evaluate the first modification to determine whether the first modification produces a valid configuration for the machine-readable code.

Advantageous implementations can include one or more of the following features. If the first modification does not produce a valid configuration for the machine-readable code, the program instructions can be operable to display an error indication or to reject the first modification.

The program instructions can be operable to display an alternative modification. If the first modification includes a new size for the first area, the alternative modification can include a preconfigured size that approximates the new size.

The program instructions can be operable to display an additional modification that is linked to the first modification in a predetermined relationship. If the first modification includes a new size for a first edge of the first area, the additional modification can include a new size for a second edge of the first area.

If the first modification includes a new size for the first area, the program instructions can also be operable to determine whether the new size complies with one or more size constraints. The size constraints can include one or more of a minimum or a maximum size associated with the first area, an aspect ratio associated with the first area, a dimension for the first area that is an integral number of times an element dimension, and a page size associated with the electronic document.

The electronic document can have one or more items that are independently positionable of the first area. If the first modification includes a repositioning of the first area or of one or more of the items, the program instructions can be operable to determine whether one or more of the items overlaps a boundary area in the first area.

The first modification can include a specification of a new field length associated with one of the selected fields, and the instructions can be further operable to calculate a total data amount associated with the selected fields based on the new field length, and to determine whether the total data amount exceeds a maximum data amount associated with the machine-readable code.

The first modification can include an identification of an additional selected field, the additional selected field having an associated field length, and the instructions can be further operable to calculate a total data amount associated with the selected fields based on the field length associated with the additional selected field, and to determine whether the total data amount exceeds a maximum data amount associated with the machine-readable code. The instructions can also be operable to display a comparison of the total data amount and the maximum data amount.

The program instructions can be operable to receive input data for one or more of the selected fields, calculate a total data amount associated with the input data, and determine whether the total data amount exceeds a maximum data amount associated with the machine-readable code. If the total data amount exceeds the maximum data amount, the instructions can be operable to display an indication of by how much the total data amount exceeds the maximum data amount.

In another aspect, the techniques feature a computer program product with instructions operable to receive an electronic document with one or more fields, receive user input with field data provided for one or more of the fields, generate input data containing the field data and metadata that provides a self-contained description of the field data, encode the input data into a machine-readable code, and generate a final representation of the electronic document with a display of the machine-readable code.

Advantageous implementations can include one or more of the following features. The input data can be represented in a markup language. The markup language can be Extensible Markup Language (XML). The input data can also be represented in a key-value format.

In another aspect, the techniques feature a computer program product with instructions operable to receive machine-readable code data generated by reading a machine-readable code displayed in a first document. The machine-readable code data contains one or more data entries corresponding to fields in the first document, as well as metadata that provides a self-contained description of the data entries. For each data entry in the one or more data entries, the program instructions are further operable to use the metadata to identify a field in a target system to which to assign the data entry, and to assign the data entry to the identified field.

Advantageous implementations can include one or more of the following features. The machine-readable code data can be represented in a markup language. The markup language can be XML. The machine-readable code data can also be represented in a key-value format.

The target system can include an electronic document, a database, or an enterprise system. The target electronic document can be an electronic version of the first document. That is, if the first (source) document corresponds to an electronic document, the source and target electronic documents can be instances of the same electronic document. Alternatively, the source and target electronic documents can be instances of distinct electronic documents.

In another aspect, the techniques feature a method that includes generating field data and metadata by reading a machine-readable code that is displayed in a document. The document includes a first set of fields, and the machine-readable code encodes the field data, which corresponds to the first set of fields, as well as the metadata, which provides a self-contained description of the field data. The method further includes using the metadata to identify a second set of fields in a target system, and assigning the field data to the second set of fields in the target system.

In another aspect, the techniques feature a computer program product with instructions operable to receive machine-readable code data generated by reading a machine-readable code that is displayed in a document, and to transform the machine-readable code data into transformed data. The machine-readable code data includes one or more data entries corresponding to fields in the document, as well as first metadata that provides a first self-contained description of the data entries. The transformed data includes the data entries and second, distinct metadata that provides a second self-contained description of the data entries.

Advantageous implementations can include one or more of the following features. The machine-readable code data and the transformed data can be represented in XML. The instructions to transform the machine-readable code data can include instructions to execute an Extensible Stylesheet Language Transformations (XSLT) processor. The instructions can be further operable to send the transformed data to a target system. The target system can be an enterprise system.

The techniques described in this specification can be implemented to realize one or more of the following advantages. The techniques can be used to create an electronic form or document with one or more bar code areas, where each bar code area is set up to display a bar code that encodes data from the form. The bar codes can be encoded using the data from the form and printed in the bar code areas of the form when a printout of the form is generated (i.e., when the electronic form is printed, thereby transferring the form from an electronic or online environment to a paper or offline environment). A bar code can be used to represent all or some of the data in the form (e.g., data provided for specific fields in the form), so that the data can be scanned and automatically entered into another version of the electronic form, or into another electronic form or system.

The techniques can be used to provide an interface that guides a user (e.g., a form author) through the process of setting up a bar code in an electronic form. The process can include operations such as specifying bar code parameters, specifying which fields in the form are to be encoded into the bar code, and specifying the location and size of a bar code area in which to display the bar code. The bar code parameters can be high-level parameters (e.g., a description of the environment in which the form and the bar code will be used). The parameters can be used to determine and set low-level encoding properties and attributes (e.g., the module width, row height, aspect ratio, level of data compaction, and level of error correction for a PDF417 bar code), thereby reducing or eliminating the need for the user to learn or work with such low-level properties and attributes.

The fields specified by the user can be automatically associated with a bar code, so that the bar code is encoded using data provided for the fields. Thus, the user does not need to learn or use another mechanism (e.g., scripting) to specify that data provided for the fields is to be used as input for encoding the bar code, or to otherwise associate the fields with the bar code.

Consequently, the techniques described in this specification can enable users who are not bar code experts (e.g., users who do not know the details of bar code symbologies or programming techniques such as scripting) to create forms with bar codes that are likely to be valid and decodable. By guiding users through the process of setting up bar codes, the techniques take the guesswork out of creating forms with valid bar codes.

The techniques can be used to specify constraints that prevent or discourage users from making common mistakes in the creation of forms with bar codes. For example, rather than allowing a user to freely change the size or shape of a bar code area, constraints can be set up to ensure that the user does not select a size or shape that is not permitted or supported by a bar code type, that does not accommodate the data to be encoded, or that does not provide adequate space for error detection and correction values. Other examples of constraints include constraints on the amount of data to be encoded (e.g., the user can be restricted from selecting fields whose aggregate data exceeds the data limit of a bar code), and constraints on the location of a bar code area and other objects in a form (e.g., the user can be restricted from specifying a layout in which one or more objects in the form overlap a quiet zone in a bar code area).

The techniques can also be used to allow users to test their bar codes without having to actually print out forms and verify whether the bar codes in the forms are decodable and valid. For example, a user can enter test data into the fields he has associated with a bar code, and an indication can be given to the user if the test data exceeds the data capacity of the bar code, thereby letting the user know that he has to increase the size of the bar code or take some other appropriate action, such as specifying bar code parameters that require a lower level of error correction, if he wants the bar code to be able to validly encode the test data (or other similar data). Of course, users can still print out and validate test bar codes, but the techniques can be used to verify that certain conditions (e.g., accommodation of a certain amount of data) are satisfied without having to generate test bar codes.

By preventing or discouraging users from making mistakes in the process of creating forms with bar codes, the techniques can save time, and help users create forms that have a high probability of being scanned and decoded successfully. The techniques can also simplify the process of laying out a form or document by determining and displaying a minimum size and shape for a bar code to be included in the form, thereby allowing a user to see the impact of adding the bar code to the form, and making it easy for the user to arrange the bar code area and the other objects in the form in a manner that does not interfere with the bar code.

Moreover, the techniques described in this specification enable the use of forms or documents with bar codes: Data can be filled into an electronic form, a hardcopy of the form can be printed with a bar code that encodes data in the form, and the bar code can be scanned to recover the data so that it can be inserted into another electronic form or system. The use of forms in this manner enables a workflow in which a form can be transferred quickly, easily, and repeatedly between electronic and paper environments. Such a workflow is made possible through the creation and use of bar codes, which maintain a representation of data in a paper environment that makes it easy to feed the data back into an electronic environment.

Although the description in this specification focuses on bar codes, the description is provided by way of example only, and it is to be understood that the techniques of the present invention are applicable to and can be used with other types of machine-readable codes.

These general and specific aspects can be implemented using a computer program, a method, a system or apparatus, or any combination of computer programs, methods, or systems. The details of one or more embodiments of the invention are set forth in the accompanying drawings and in the description below. Other features, objects, and advantages of the invention will be apparent from the description, the drawings, and the claims.

BRIEF DESCRIPTION OF THE DRAWINGS

Like reference numbers and designations in the various drawings indicate like elements.

DETAILED DESCRIPTION

Traditionally, bar codes have been used to identify objects. For example, a ten digit UPC code assigned to a product can be encoded into a UPC-A bar code and printed on a label affixed to the product. The UPC-A bar code can then be scanned and decoded, e.g., at a cash register, in order to read the product's UPC code and thereby identify the product. The decoded UPC code can then be used in various ways—e.g., the UPC code can be used to look up the price of the product in a database, or to update an inventory level for the product.

Bar codes can also be used on forms. Rather than using a bar code to encode something about a form (e.g., an identification of the form), however, a bar code can also be used to encode data contained in the form, so that such data can be reproduced by scanning and decoding the bar code. Bar codes used in this manner provide a quick and accurate means to enter data into a target system, such as a database or an application running on a computer. More specifically, the data to be entered into the target system—i.e., the data that is entered in a form—can be encoded into a bar code and printed on the form. At a later time, the bar code can be scanned and decoded in order to reproduce the data, and the reproduced data can be entered into the target system (either directly or after some processing). The use of bar codes in this manner reduces the potential for errors from manual entry of the data into the target system. However, it is important to make sure that bar codes used in this manner work properly (i.e., that the bar codes are valid and decodable), since such bar codes potentially represent a significant amount of data (e.g., all the fields in a form), rather than a small amount of information, such as an identification of the form.

Figure 1:
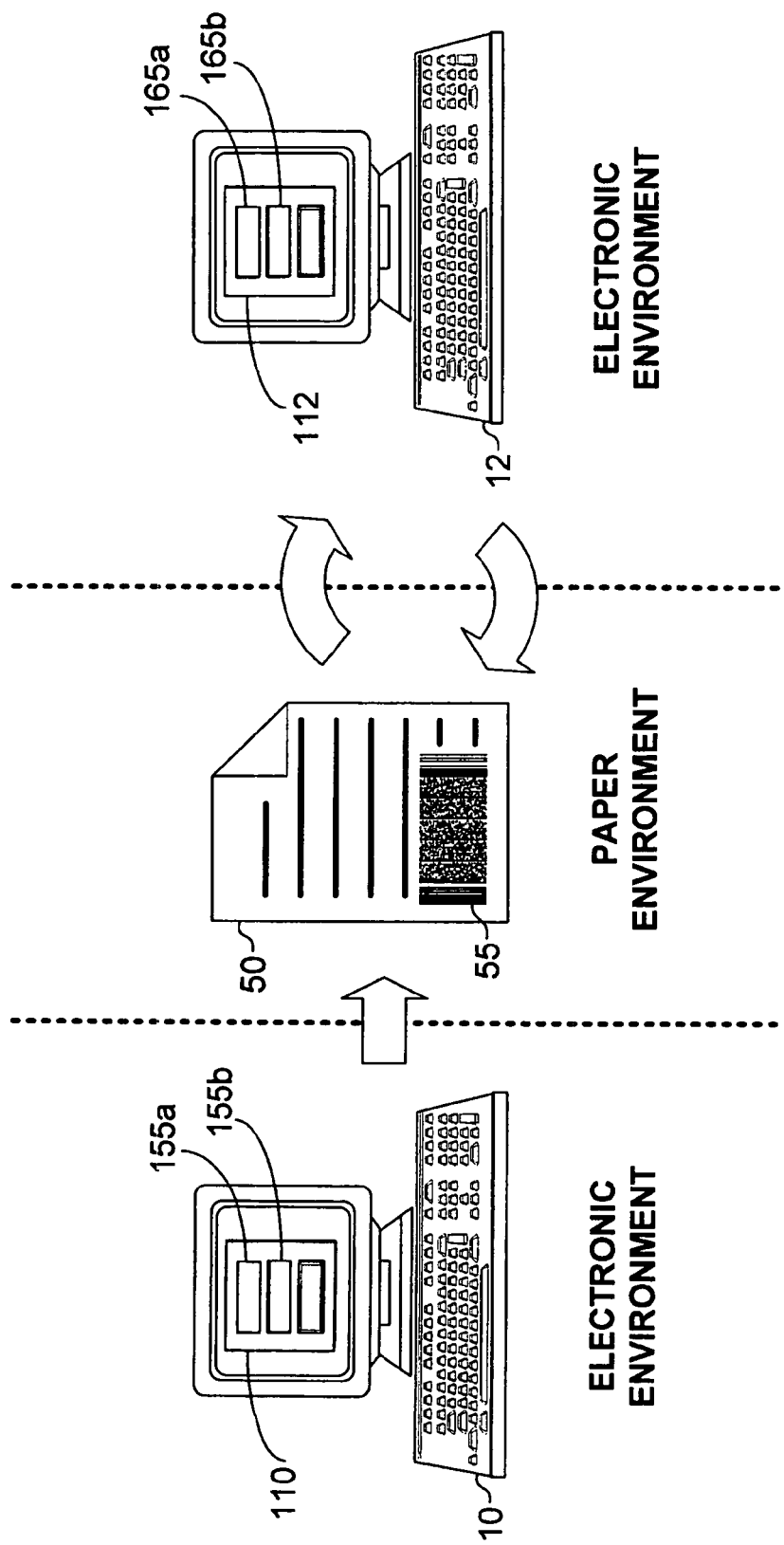
FIG. 1 illustrates a workflow that uses forms with bar codes.

FIG. 1 illustrates an example of a work flow that uses forms with bar codes in the manner specified above. As shown in FIG. 1, a computer system 10 can be used to collect data. The data can be collected by means of an electronic form or document 110 into which a user inputs the data, or by other means such as a database management system or an application that queries the user for the data or retrieves the data from an appropriate source. The electronic document 110 can include multiple fields 155a, 155b that can be used to collect the data—for example, fields 155a and 155b can be used to collect the first name and last name of a person.

After the data has been collected, the work flow depicted in FIG. 1 subsequently requires the data or portions of the data to move from an electronic environment to a paper environment. For example, the data may represent data about a patient that was collected in an electronic document 110 at a first hospital. If the patient is transferred to a second hospital, the data about the patient may need to be transferred with the patient. In this example, the data can be transferred by printing out a hardcopy of the electronic document 110 and sending the hardcopy along with the patient. The printout 50 of the electronic document 110 can include a representation of the data that was collected in the electronic environment. Some of the data can be represented conventionally—i.e., by printing out the data directly. However, some of the data can also be represented by a bar code 55 displayed in the printout 50. That is, some (or all) of the data that was collected in the electronic environment can be encoded into a bar code, and the bar code can be printed out in a section of the printout 50.

At a later point in time, the data or portions of the data may need to move from a paper environment back into an electronic environment. Continuing with the hospital example, when the patient eventually arrives at the second hospital, the patient data may need to be entered into a computer system 12 at the second hospital. The computer system 12 can include an electronic form or document 112 that is used to store the patient data. Some of the data from the printout 50 can be manually entered into the electronic document 112—e.g., by an operator who reads the printout 50 and manually re-enters the data into multiple fields 165a, 165b in the electronic document 112.

In contrast, the data that was encoded into the bar code 55 does not need to be re-entered manually. Instead, the data can be produced by using a bar code reader to scan and decode the bar code 55. Such data can then be transferred (either directly or after further processing, e.g., to change the format of the data) into the appropriate fields in the electronic document 112 or in another target system (e.g., an application or database system in the computer system 12).

The use of bar codes to encode some (or all) of the data in an electronic document facilitates a work flow such as the work flow shown in FIG. 1, where data may be transferred repeatedly from an electronic environment (e.g., an electronic form) to a paper environment (e.g., a printout of the electronic form), and back again to an electronic environment (e.g., an electronic form that may be the same form as the first electronic form, or a different form than the first electronic form). The use of bar codes in such a workflow makes the transfer of data quick and accurate, as the data does not need to be re-entered manually every time the work flow requires a transition from a paper environment to an electronic environment. This can be particularly significant for critical data—e.g., in the hospital example, the bar code 55 can be used to encode allergy, drug, and dosage information for the patient, so as to minimize the chance that such information will be entered incorrectly in the computer system of the second hospital.

Figure 2:
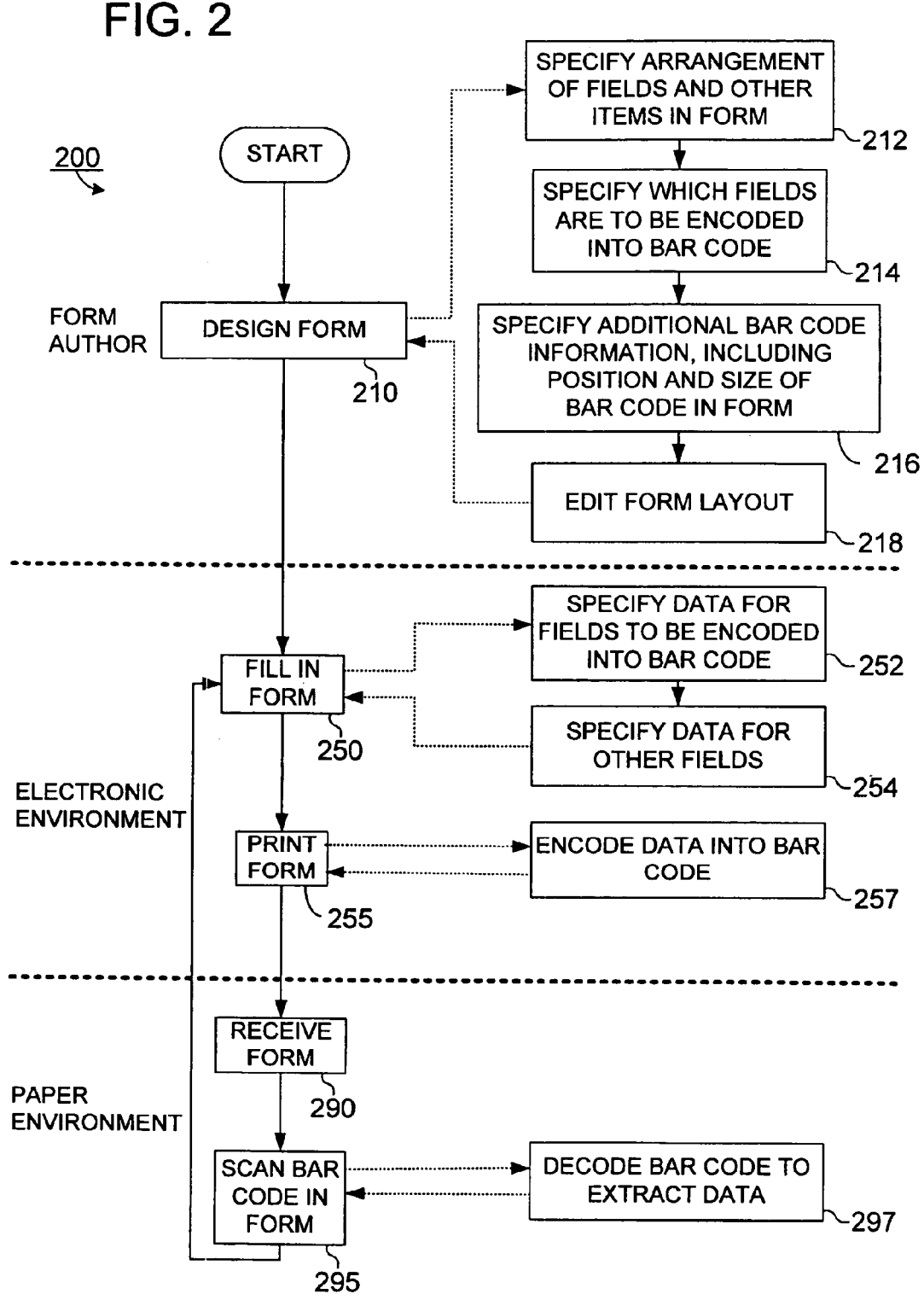
FIG. 2 is a flowchart illustrating a process that implements the workflow of FIG. 1.

FIG. 2 illustrates an example process 200 that implements the work flow shown in FIG. 1. The process 200 is divided into three parts, as shown by the dashed lines in FIG. 2. In the first part of the process, a form author designs a form in which some of the data from the form is to be encoded into a bar code on the form (210). To create such a form, the form author can specify an arrangement of fields, text (e.g., instructions for filling out the fields in the form), graphics, and other items to be included in the form (212). The form author can then specify which of the fields in the form are to be encoded into the bar code (214), as well as additional information about the bar code to be produced (216). Such information can include, for example, the type of bar code (e.g., the symbology to be used in creating the bar code), and the position and size of a bar code area that indicate where on the form the bar code is to be printed and what the dimensions of the bar code are to be. The form author can then edit the form layout (218), e.g., by moving or re-sizing the bar code area or the other objects in the form, or by modifying various information in or about the form (e.g., the page size and orientation, the background color, etc.) In general, the form author can modify the form in any manner that is customarily used to create and edit forms or documents.

The second and third parts of the process 200 represent use of the form created by the form author. The second part of the process 200 involves use of the form in an electronic environment. A data provider first fills in the form (250), e.g., by typing data into the various fields included in the form. In so doing, the data provider can specify data for the fields that are to be encoded into the bar code (252), as well as data for the other fields in the form (254).

The data provider or another person can then print out the form (255). When the form is printed, some of the data that was entered into the form may be printed directly on the form (e.g., the data may be printed exactly as it was entered). In addition, the bar code input data—i.e., the data that was entered into the fields that are associated with the bar code—is encoded into the bar code (257), and the bar code that is generated as a result of the encoding process is displayed on the form in the bar code area that was specified by the form author. The bar code is produced according to the bar code information that was specified by the form author—e.g., the bar code can use the symbology and be sized according to the dimensions specified by the form author. In some implementations, the bar code input data can also be printed directly on the form, so that such data can be read by a human as well as by a bar code reader.

The printing of the form (including the bar code that is displayed in the form) represents a transition in the work flow from an electronic environment to a paper environment. The printout or hardcopy version of the form can be used as any other form would be used. For example, data may be read from the form and used as necessary. Data may also be added to the form (e.g., by writing values in blank fields, checking boxes, and so forth).

Eventually, the work flow may require the data in the form to be transferred back into an electronic environment. The bar code on the form facilitates this transition back to the electronic environment. Specifically, after a form processor has received the hardcopy of the form (290), the form processor can scan (295) and decode (297) the bar code in order to reproduce the data that was encoded into the bar code. Such data can then be processed (e.g., to change the format of the data), and transmitted to the destination electronic environment. For example, the data may be transmitted to a database or to an application running on a computer. The database or application may include input fields into which the data can be entered. For instance, an application may display an electronic form containing the input fields, and the data can be entered into the appropriate input fields in the form. Where the electronic form is another instance of the original electronic form, the form itself can be thought of as re-entering an electronic environment.

The second and third parts of the process 200 can be repeated, as indicated by the loop between the electronic and paper environments shown in FIG. 2. For example, the data in the electronic form can be modified or added to, and the form can be printed out, again including a bar code that represents some or all of the data in the form. The bar code can subsequently be scanned in order to re-enter the data into an electronic environment (e.g., another instance of the electronic form). In this manner, the process 200 enables a roundtrip form work flow, where a form can transition repeatedly between the electronic and paper domains. The work flow can also include alternative paths, such as transferring the data from a bar code to a destination other than a form (e.g., a database).

Figure 3:
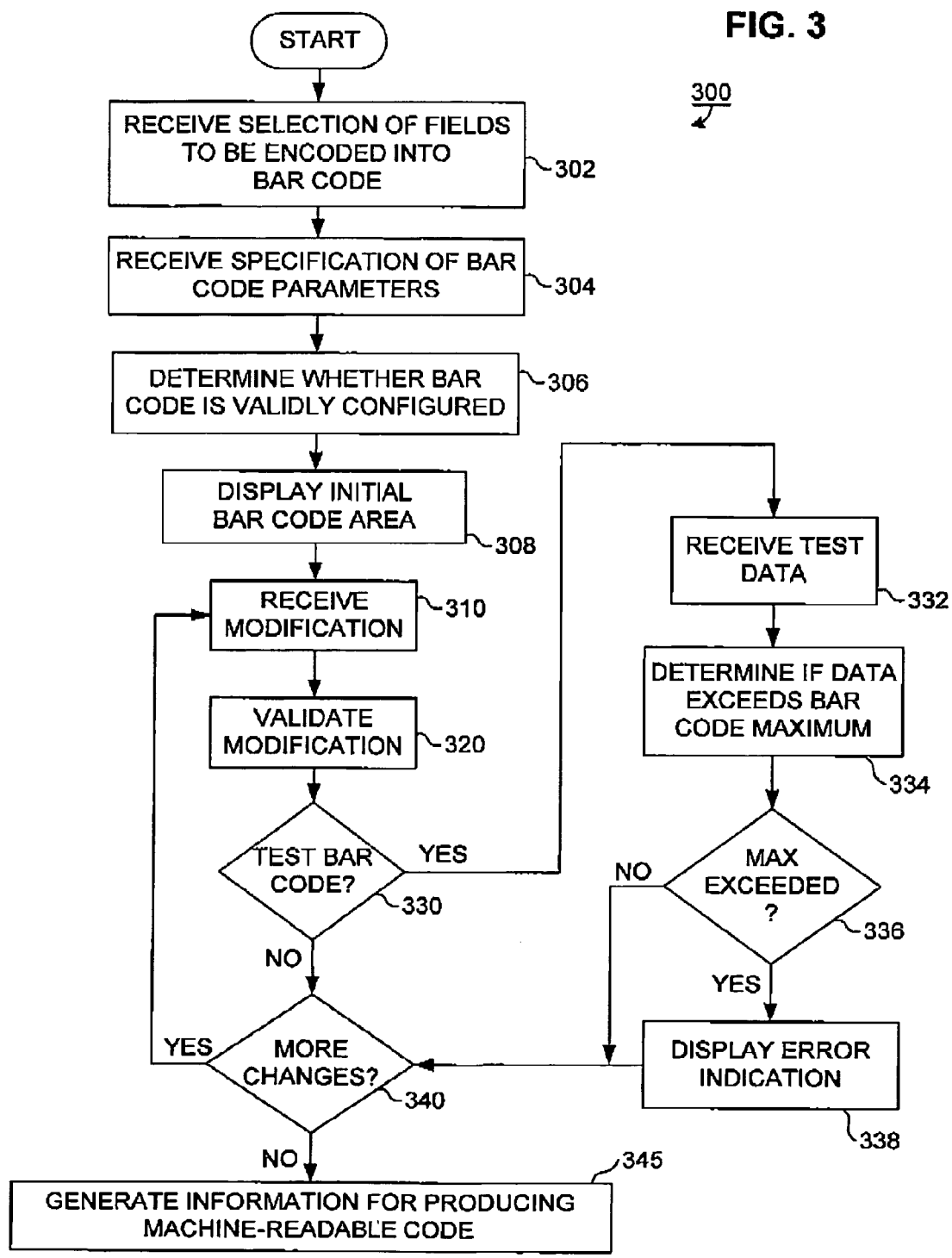
FIG. 3 is a flowchart illustrating a process for authoring forms.

FIG. 3 illustrates an example process 300 for authoring a form that is to include one or more bar codes. The process 300 can be performed as part of the process 200—e.g., in the portion 210 of the process 200 where the form author designs a form.

The process 300 can be implemented by an application that is designed to help a user (e.g., a form author) create a form that is to include a bar code. (The form can include more than one bar code, but the same process can be used to create each bar code—hence, for purposes of simplicity, the discussion below assumes that the form is to include only one bar code.) The form authoring application can display a list of the fields in the form, and the user can specify which fields are to be encoded into the bar code (302) (e.g., by selecting one or more fields from the displayed list of fields).

After the user has specified which fields are to be encoded into the bar code ("no" branch from decision step 340), the application can automatically generate bar code information that associates the selected fields with the bar code (345). For example, the application can generate a marker or instructions that specify that the bar code is to be produced using data provided for the selected fields (i.e., field data provided by a person filling in the form at a later time). Such bar code information or generation instructions, which can be stored in the form itself, can be generated without requiring further user input (e.g., without requiring user-provided scripts to associate the selected fields with the bar code). In one implementation, the bar code generation instructions include an automatically generated script that assembles and organizes the field data with self-describing metadata (i.e., metadata that provides a self-contained description of the field data, as discussed further below). The bar code information or generation instructions can also specify that the bar code is to be produced according to one or more bar code parameters (discussed below).

In addition to specifying a selection of fields, the user can also specify one or more bar code parameters that describe the bar code to be produced (304). The parameters can include, for example, a symbology to use for the bar code, an indication of whether to compress the data to be encoded (i.e., whether to compress the data provided for the selected fields before encoding such data into the bar code), and a decode condition (discussed below).

In some implementations, one or more of the parameters may be fixed—for example, the bar code symbology may be predetermined, so that the user does not have a choice, and hence need not choose, among different symbologies. In other implementations, the user may be provided a choice for certain parameters (e.g., the bar code symbology), and the user can select values for such parameters based on the environment in which the forms and bar codes are expected to be used, as well as other factors. For example, a user can select a particular symbology based on the types of symbologies that the bar code readers used by the form processors are expected to be able to handle. As another example, the user can specify whether or not data compression is to be used based on whether the form processors are expected to have the capacity to decompress data. Users can also select parameters based on other considerations—for example, a particular symbology may be chosen because it is better suited for a particular application (e.g., where a certain type or amount of data is to be encoded, or where a certain level of error detection and correction is required).

As specified above, in one implementation, one of the parameters that the user can specify is a decode condition. The decode condition describes the environment or conditions under which the bar code will be produced and used. For example, the decode condition can include an indication of how the form and the bar code are to be printed, transmitted, and scanned. In one implementation, the decode condition represents the technology that is expected to be used to decode the bar code (e.g., a wand or other handheld scanner, a fax server, a document scanner, etc.).

The decode condition, as well as the other bar code parameters, can be used to set various attributes or properties for the bar code (e.g., the minimum element size and the level of error correction). As an example, if the user indicates that a form and its bar code are to be printed on a dot matrix printer, transmitted by fax, and scanned by a scanner with a 300 dpi (dots-per-inch) resolution, a larger element size and a higher level of error correction can be used than if the user had indicated that the form and the bar code are to be printed on a laser printer, transmitted by hand delivery, and scanned by a laser wand scanner. As a more specific example, in one implementation, if the bar code parameters indicate that a PDF417 bar code is to be scanned by a fax server, the element size for the bar code is set to have an x-dimension of 4/300 inches and a y-dimension of 8/300 inches (twice the size of the x-dimension).

Various other properties or constraints can also be set based on the user input (including the selection of fields to be encoded into the bar code and the bar code parameters). For example, the user input can be used to determine the number of rows or columns of elements to include in a two-dimensional bar code. Given a certain element size, that determination can then be used to compute a geometric size for the bar code on a page. The computed size can in turn be used to establish a minimum size constraint for the bar code area in which to display the bar code—e.g., the minimum size of the bar code area can be calculated by adding the size of a quiet zone to be displayed around the bar code to the computed size of the bar code.

Figure 4:
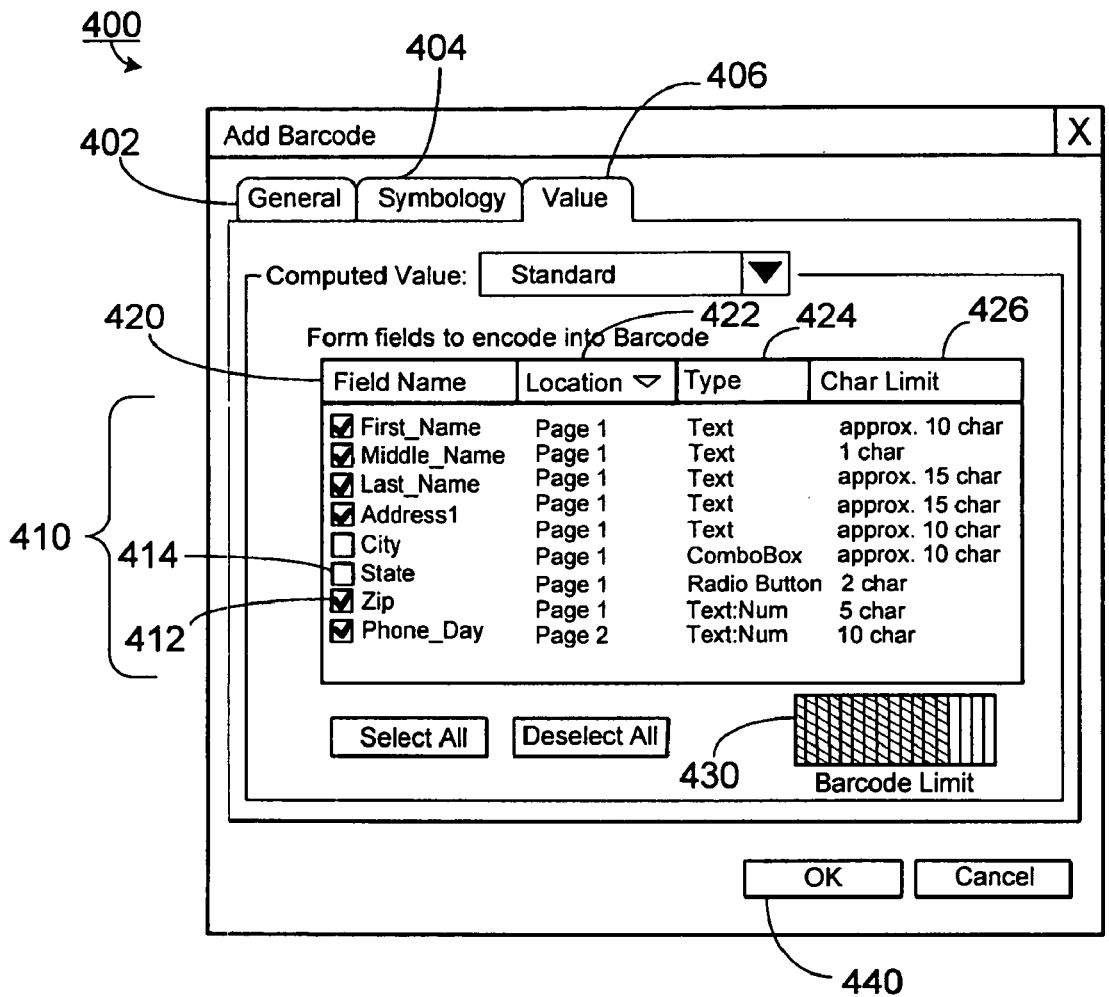
FIG. 4 illustrates a user interface than can be used to create a bar code in a form.

FIG. 4 illustrates an example of a user interface 400 that can be used in a form authoring application to add a bar code to a form. The user interface 400 includes multiple tabs 402, 404, 406 that can be used to specify various information related to the bar code. For example, the "General" tab 402 can be used to specify general parameters (such as a decode condition), the "Symbology" tab 404 can be used to select a bar code symbology, and the "Value" tab 406 can be used to select the fields to be encoded into the bar code. In the example in FIG. 4, the Value tab 406 is active, and the user interface 400 displays a list of fields 410 that are included in the form. The user can select which fields to encode into the bar code by simply checking the boxes next to the desired fields. For example, if the user wants the "State" field to be included in the bar code, he can click on the box 414, which will add the field to the list of fields to be encoded. A check mark can then be drawn in the box 414 to indicate that the field will be encoded. If the user changes his mind about encoding a field, he can un-select the field by clicking on the appropriate box—for example, the user can click on the box 412 to specify that he does not want the "Zip" field to be included in the bar code.

The user interface 400 can display various information about the fields in the form. For example, the user interface 400 includes the columns 420, 422, 424, and 426, which display the name, location, type, and length of each field, respectively. This information is discussed in more detail below. When the user is satisfied with the bar code specification that he has created, he can click on the "OK" button 440 to save the specification.

Returning to the process 300 in FIG. 3, when the user has finished prescribing a bar code specification, the form authoring application can determine whether the specification results in a valid bar code configuration (306). That is, the application can determine whether the bar code is validly configured based on the specification provided by the user. Such a determination can encompass a variety of checks.

For example, the application can check whether the chosen symbology supports (i.e., can encode) the type of data that will be provided for the selected fields. As described previously, some symbologies can only encode certain types of data (e.g., numeric digits, or alphanumeric characters). Accordingly, the application can ascertain the type of input data to be encoded into the bar code, and verify whether the chosen symbology can encode that type of data. The application can ascertain the type of input data by using metadata that describes the selected fields (e.g., type information for the selected fields, as shown in the "Type" column 424 in the user interface in FIG. 4). In some implementations, this type of check can be made earlier in the process—for example, the check can be made as the user selects fields in the user interface 400. Alternatively, the check could be dispensed with altogether—for example, when a user selects a symbology, the fields that can contain data of a type that is not supported by the symbology can be "greyed out," so that the user cannot select those fields for inclusion into the bar code.

Another type of integrity check that can be used in validating the configuration of a bar code is a check regarding the amount of data to be encoded. Many symbologies include a limit on the amount of data that can be encoded into a bar code. Accordingly, the form authoring application can check whether a bar code of a given symbology can accommodate the amount of data likely to be provided for the selected fields. As before, such a determination can be made by using field metadata (e.g., maximum or approximate field lengths, as shown in the "Char Limit" column 426 in the user interface 400). For example, the application can first calculate a total data amount likely to be encoded by adding the sizes of the fields that were selected by the user for inclusion in the bar code. The application can then compare the total data amount with a maximum data amount associated with the bar code (e.g., the maximum data amount that can be encoded according to the bar code's symbology) in order to determine whether the total data amount exceeds the maximum data amount.

As with the check regarding data types, the check regarding data amounts can be made earlier in the process. For example, the user interface 400 shown in FIG. 4 includes a meter 430 that displays how close the aggregate data size of the selected fields comes to the bar code data limit. Displaying a comparison of the aggregate data size of the selected fields and the bar code data limit can be useful, especially in conjunction with a display of the size of each individual field (e.g., as in the column 426), as such a display can help the user decide which fields to include or exclude from the bar code in order to create a valid bar code.

In some circumstances, it may not be possible or feasible to implement an integrity check based on the amount of data to be encoded. In some implementations, the amount of data that can be encoded into a bar code can be content-dependent (i.e., the amount of data that can be encoded depends on the content of the data). For example, in some implementations, the input data is compressed or compacted before being encoded. Because the amount of compression or compaction can depend on the content of the input data, it can be difficult to predict the amount of compression or compaction that will occur, and hence to determine whether a bar code of a given capacity can accommodate the input data. In such circumstances, the form author can be asked to provide what would constitute a "large" sample of input data. The sample input data can then be processed (e.g., by compressing or compacting the data) in order to determine the length of a potential data set to be encoded, and hence how large a bar code may be required. Alternatively, the integrity check regarding the amount of data to be encoded can be skipped in such circumstances.

Other types of validity or integrity checks can also be made, and, as with the checks above, such checks can be based on metadata that describes the fields to be encoded, as well as on parameters that describe the bar code to be produced. The checks can be performed either while the user is setting forth a bar code specification or after the user has completed the specification, and an error indication can be displayed if the specification provided by the user does not produce a valid bar code configuration. Either way, the user can be given feedback at the time that the bar code specification is being created about whether the bar code is validly configured.

Continuing with the process 300 in FIG. 3, after the bar code specification has been validated, an initial bar code area can be displayed in a window or other interface that represents the form or document (308). The window can be a WYSIWYG (what you see is what you get) representation of what the form will look like when it is printed, in which case the bar code area can indicate the location, shape, and size of the bar code to be produced.

In one implementation, the bar code area that is displayed shows a minimum size required for the bar code. The determination of the minimum size can be based on the bar code specification, including, for example, the aggregate data size of the fields to be encoded into the bar code (which can necessitate a certain number of rows and columns of elements), and the decode condition (which can necessitate a certain element size, or a certain level of error detection and correction, and hence a certain amount of overhead for encoding checksum values). The bar code area can also include a boundary area or quiet zone around the bar code that should not to be covered up.

Displaying a bar code area in a visual representation of the form can minimize the impact of adding a bar code to the form: By giving the user an indication of the size and shape of the area required for the bar code, the user can see the effect of adding the bar code to the form, and can arrange the rest of the form (e.g., the fields and other objects in the form) in a manner that does not interfere with the bar code.

Continuing with the process 300, after displaying the initial bar code area, the form authoring application allows the user to edit the form. Specifically, the application allows the user to make a series of modifications to the form (310). The modifications can include changes to various aspects of the form—for example, a modification can include a change to the bar code area, to the bar code parameters, to the fields to be encoded into the bar code, or to other objects or items in the form.

Each modification can be validated by the application to ensure that the bar code is still validly configured after the modification (320). That is, each modification can be evaluated to determine if the modification results in a valid bar code configuration.

The evaluation of the modifications can be based on a number of predetermined constraints or restrictions. There can be several types or categories of such restrictions. For example, restrictions can be set up to limit the ability of the user to make changes to the data to be encoded (e.g., changes such as increasing the size of the fields to be encoded, or including more fields in the set of fields to be encoded), or to resize or relocate the bar code area in a manner that is likely to render the bar code invalid. The validation of modifications is discussed in more detail below in conjunction with FIGS. 5A and 5B.

In one implementation, the form authoring application also enables the user to test the form being created. For example, if the user wants to test the form after making a series of modifications ("yes" branch of decision 330), the user can specify test data for the fields to be encoded into the bar code, and the application can determine whether the test data can be encoded into a valid bar code.

The application can make such a determination by, for example, receiving the test data (332), calculating a total data amount for the test data (e.g., by adding the number of characters or bytes included in the test data), and comparing the total data amount with a maximum data amount associated with the bar code in order to determine whether the total data amount exceeds the maximum data amount (334). If the total data amount exceeds the maximum data amount ("yes" branch of decision 336), the application can display an error indication (338). In one implementation, the error indication includes a specification of by how much the total data amount exceeds the maximum data amount, so as to provide the user with an idea of what an appropriate remedial action might be (i.e., the user can get a sense for how many fields or how much data needs to be removed from the bar code).

As shown by the loop in the process 300 ("yes" branch of decision 340), the user can continue to make modifications to the form and to test the form until he is satisfied with the form ("no" branch of decision 340).

Figure 5A:
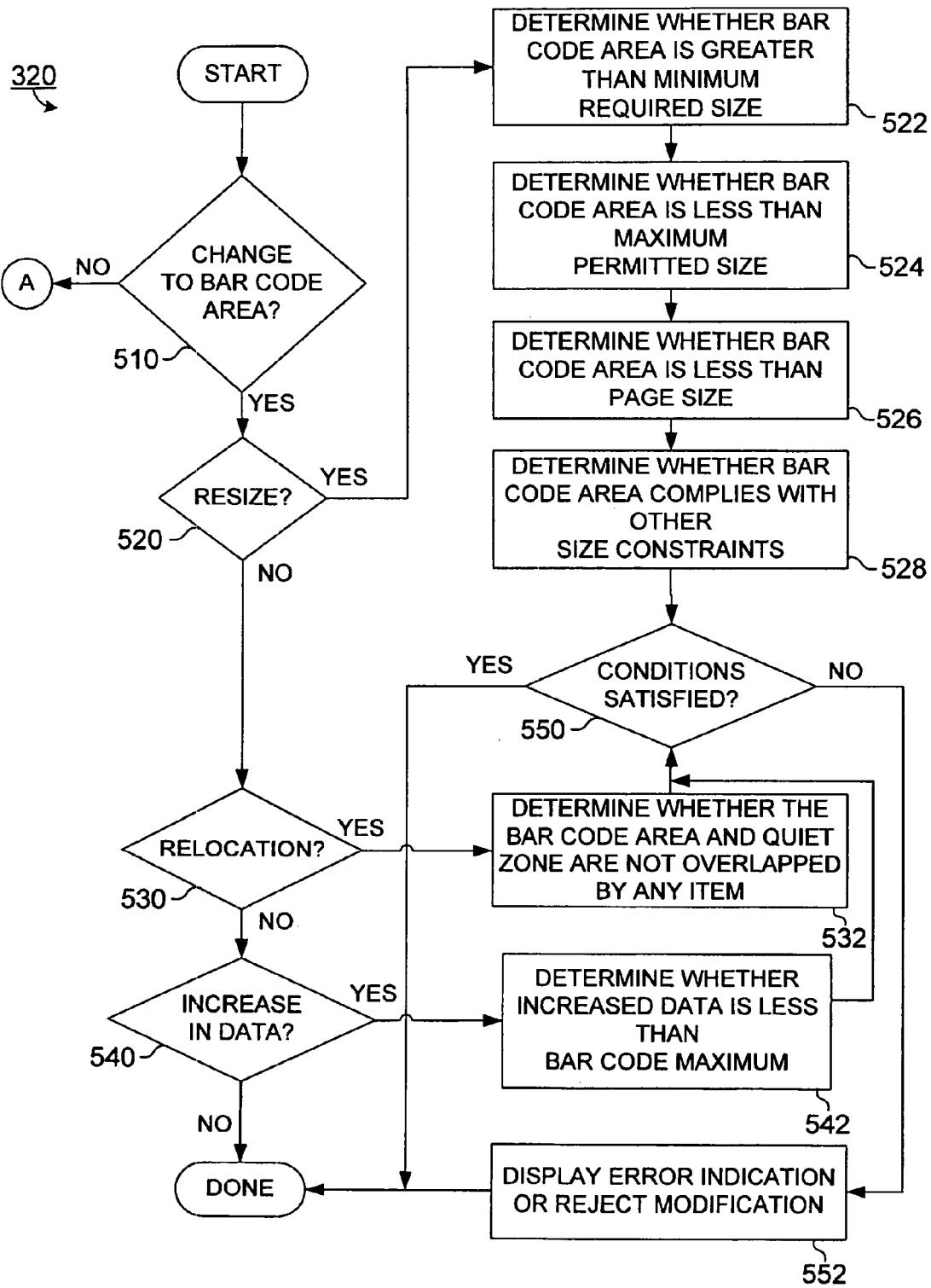
FIGS. 5A and 5B are flowcharts illustrating a process for validating modifications made in the process of authoring a form.
Figure 5B:
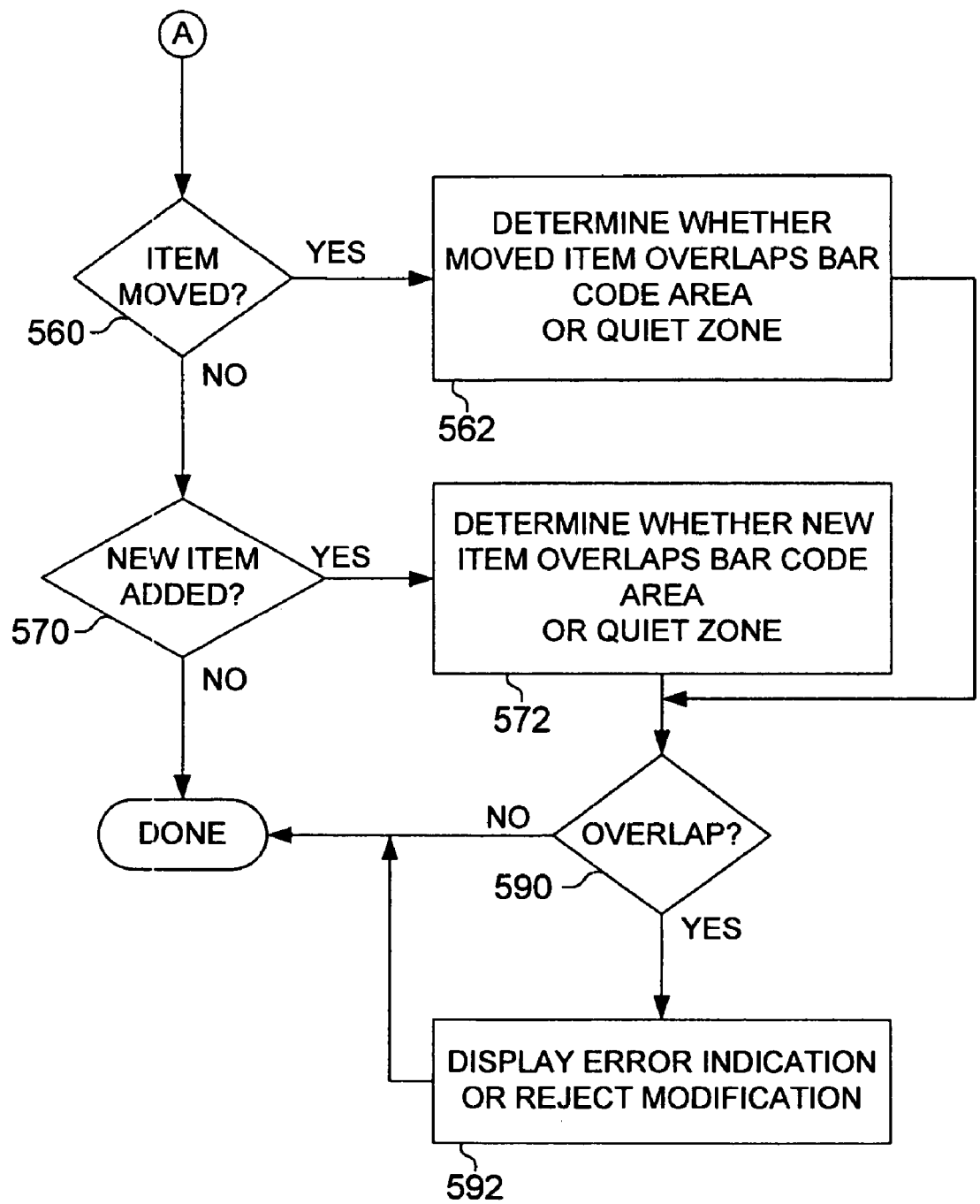

FIGS. 5A and 5B illustrate an example process 320 for evaluating modifications made to a form. As described previously, the process 320 can include validation or integrity checks based on a number of predetermined constraints or restrictions. There can be several constraints corresponding to each type of modification. For example, if the user makes a modification related to the bar code ("yes" branch of decision 510), the modification may be a resizing of the bar code area, a relocation of the bar code area, or a change to the data to be encoded. Each such type of modification can cause a form authoring application to check one or more corresponding constraints.

If the modification is a resizing of the bar code area ("yes" branch of decision 520), several constraints can be checked to determine whether the bar code configuration is still valid. For example, if the size of the bar code area is decreased (e.g., by resizing one or more edges of the bar code area displayed in the visual representation of the form), the form authoring application can check to see whether the new size of the bar code area is greater than the minimum size required for the bar code (522). On the other hand, if the bar code area is increased, the application can check to see whether the new size of the bar code area is less than the maximum size permitted for the bar code (524), as well as less than the page size of the form (526). The maximum size permitted for the bar code can be based on the bar code parameters (including, for example, the bar code symbology), as well as on various characteristics of the form (e.g., the page size). In some implementations, the form authoring application prevents users from contravening one or more of the size constraints (e.g., users are not permitted to make the bar code area smaller than the minimum required size or larger than the maximum permitted size).

The application can also check to see whether the modification complies with additional size constraints (528). For example, if a symbology requires a certain aspect ratio, the application can check to see that the height and width of the newly sized bar code area comply with that ratio. Other symbologies may allow only certain quantized values for the height or width of a bar code (e.g., values that are an integral number of times the height or width of a bar code element unit), in which case the application can check to ensure that the height and width of the newly sized bar code area are within the permitted values.

If all the size constraints are satisfied ("yes" branch of decision 550), the modification results in a valid bar code configuration, and the application can allow the user to make additional modifications. If, however, one or more of the constraints is not satisfied ("no" branch of decision 550), the application can respond in various ways. For example, the application can display an error message or other indication to notify the user that the modification does not produce a valid bar code configuration (552). The application can also reject the modification, e.g., by disregarding the user's attempt to resize the bar code area and displaying the bar code area as it was initially dimensioned.

As another option, the application can display an alternative modification that does produce a valid bar code configuration. For example, if a symbology allows only certain values for the height or width of a bar code, and the user does not select one of the permissible values, the application can automatically resize the bar code area to the nearest permissible value. In one implementation, such alternative modifications are displayed as "snapping increments"—i.e., as a user resizes the bar code area, the bar code area jumps or "snaps" from one permissible size to the next permissible size.

The application can also display one or more additional modifications in order to produce a valid bar code configuration. An additional modification can be linked to the initial modification (i.e., the modification made by the user) by a predetermined relationship. For example, a symbology may require a bar code to have a certain aspect ratio. In this case, if a user resizes one dimension (e.g., the width) of a bar code area (e.g., by dragging an edge of the bar code area), the application can automatically resize another dimension (e.g., the height) of the bar code area, so as to make sure that the final bar code area comports with the required aspect ratio.

Continuing with the process 320, if the modification made by the user is a relocation or repositioning of the bar code area ("yes" branch of decision 530), the application can check to see that, given the new location of the bar code area, no objects in the form overlap or cross into the bar code area (including the quiet zone to be displayed around the bar code) (532).

As described above, the form can include multiple items or objects (e.g., text and graphics) in addition to the bar code. In some implementations, such objects can be positioned or moved independently of the bar code area. The same kind of integrity check can be made whenever one of the objects in the form is moved—i.e., the application can check to see whether the repositioned object overlaps the bar code area or quiet zone. Thus, if the modification made by the user is not a modification related to the bar code ("no" branch of decision 510), the application checks to see whether the modification includes either the relocation of an item already in the form (560), or the addition of a new item to the form (570). In either scenario, the application can check to see whether the relocated item or the new item overlaps the bar code area or quiet zone (562 and 572, respectively). If the relocated item or the new item does overlap the bar code area or quiet zone ("yes" branch of decision 590), the application can display an error indication, reject the modification, or display an alternative or additional modification (592) (e.g., the application can move the relocated item back to its original position, or move the relocated item or the new item to a nearby position where it does not overlap the bar code area or quiet zone).

Continuing with the process 320, if the modification made by the user is a change to the data to be encoded, the application can apply integrity checks similar to those specified previously. For example, if the user changes the data type of a field, the application can check to see that the new data type is supported by the bar code symbology (i.e., that a bar code of the given symbology is capable of encoding the new data type).

As another example, the user may increase the amount of data to be encoded ("yes" branch of decision 540), e.g., by increasing the length of a field to be encoded, or by adding a new field to the list of fields to be encoded. In this scenario, the application can check to see whether the bar code is likely to accommodate the increased amount of data to be encoded (542). As before, this can be done by adding up the total amount of data to be encoded (or likely to be encoded), and comparing the total amount of data to a maximum data amount associated with the bar code. If the total amount of data exceeds the maximum data amount, the application can take actions similar to those described above—e.g., the application can display an error indication, reject the modification, or show an alternative modification (e.g., a revised field length for the new field to be encoded), or an additional modification (e.g., an increased size for the bar code area that enables the bar code to accommodate the additional data). The application can also display additional information, such as a comparison of the total data amount and the maximum data amount, in order to inform the user how close the aggregate data size of the bar code fields is to the maximum data amount, or by how much the aggregate data size of the bar code fields exceeds the maximum data amount.

A modification in which the user decreases rather than increases the amount of data to be encoded does not necessarily require any constraints to be checked, but the application can nevertheless make additional modifications. For example, the application can reduce the size of the bar code area, or increase the level of error detection and correction for the bar code.

After a form has been created (e.g., by a form authoring application that implements the process 300 shown in FIG. 3), the form can be used (e.g., by providing data for the fields in the form, generating the bar code, printing out the form and the bar code, and scanning and decoding the bar code, as shown in the process 200 illustrated in FIG. 2).

Figure 6:
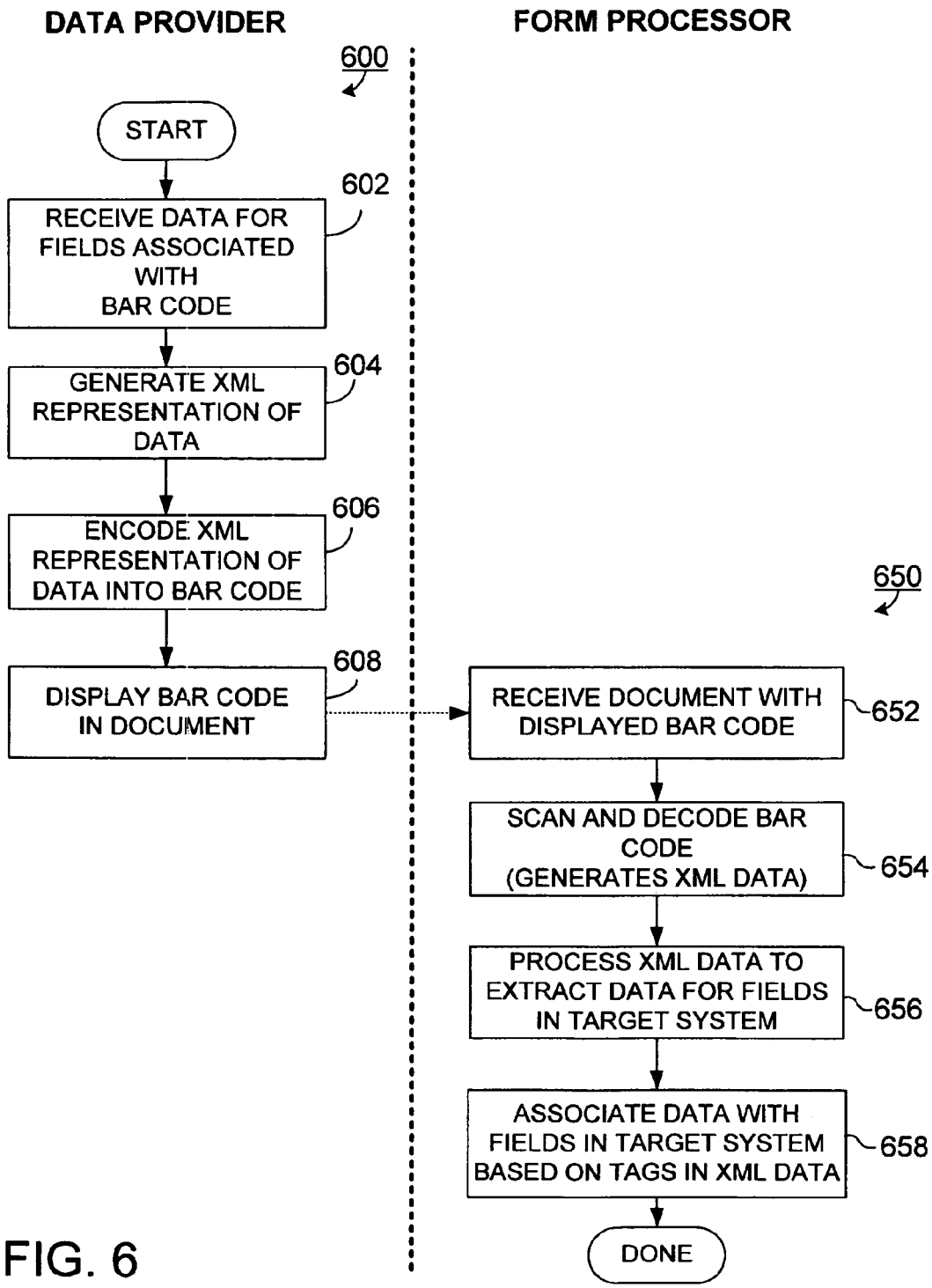
FIG. 6 is a flowchart illustrating processes for using forms with bar codes.

FIG. 6 illustrates more detailed processes 600, 650 for using documents or forms with bar codes. The process 600 is a sample process that can be used by a data provider (a party that provides data for a form and generates a copy of the form with some or all of the data encoded into a bar code), and the process 650 is a sample process that can be used by a form processor (a party that receives the form and extracts the data by scanning and decoding the bar code).

Starting on the side of the data provider, a form user first specifies data for the fields in the form, some (or all) of which can be associated with a bar code in the form. An application that can be used to display the form and to collect such data receives the data specified by the user (602). The application then generates bar code input data, which includes the user-specified field data, as well as metadata that provides a self-contained description of the field data (604).

The bar code input data can be a markup language representation of the field data—i.e., the bar code input data can include markup language tags that structure and describe the field data. For example, in one implementation, the bar code input data is an Extensible Markup Language (XML) representation of the field data—i.e., the application generates XML code with tags that structure and describe the field data. As a specific example, if a form contains fields for a street address, a city, a state, and a ZIP (Zone Improvement Plan) code, and a form user types in the address "345 Park Ave., San Jose, Calif., 95110" in those fields, the application can generate the following XML code to structure and describe that data:

```
<address>
  <street>345 Park Ave.</street>
  <city>San Jose</city>
  <state>CA</state>
  <zip>95110</zip>
</address>
```

The bar code input data can also be a key-value representation of the field data—i.e., the bar code input data can include keys that are assigned values corresponding to the field data. For example, the bar code input data from the previous example can be represented in a Microsoft Windows .ini format as follows:

```
[address]
street=345 Park Ave.
city=San Jose
state=CA
zip=95110
```

In the example above, the first line identifies a section of settings that provide address information, and the next four lines assign values to four keys (street, city, state, and zip) based on the field data. Although in this example the keys are assigned the exact values of the field data, in other examples, the field values can be processed in order determine the values to assign to the keys (e.g., a user-specified string "California" can be replaced with the standard two-letter abbreviation "CA" before being assigned to the "state" key).

Other formats in addition to the markup language format and the key-value format discussed above are also possible, but regardless of the format, the bar code input data provides a self-contained description of the field data. That is, the bar code input data includes metadata that organizes and describes the field data in a manner that allows the field data to be interpreted semantically without reference to the form from which the field data originated (the originating form). Metadata that does not fall in this category includes, for example, a reference to a name or other identifier that identifies the originating form—such metadata can conceptually be used to interpret the field data, but it is not self-describing because it requires a reference to external information about the identified form (e.g., information that indicates that for the identified form, the first field is a street address, the second field is a city name, and so forth).

In contrast, a self-contained description does not depend on knowledge of or reference to information about the originating form. A self-contained description can be based on the names of the fields in the form (e.g., the XML tags in the example above can correspond to the field names in the form), but the form itself need not be known in order to interpret the field data, which means that the description is form-independent. For example, the field data in the XML code fragment and the key-value pairs specified above can be interpreted without any knowledge of or reference to the form that was used to collect the field data.

The application then encodes the bar code input data into a bar code (606). The application can do so by invoking an encoding procedure using the bar code input data (e.g., the XML representation of the user-specified data) as input. The encoding procedure generates a bar code that can be displayed in a final representation (e.g., a printout) of the form (608). The final representation of the form can then be transmitted (e.g., by hand delivery or fax transmission) to a form processor.

On the side of the form processor, a user receives the final representation of the form (652), and scans and decodes the bar code that is displayed in the form (654). The data generated by scanning and decoding the bar code (the bar code output data) should be the same as the bar code input data, unless an error occurs in the process—i.e., the bar code output data should include the same user-specified data and metadata that was encoded into the bar code.

The bar code output data can then be processed in order to extract the user-specified data (656). The metadata in the bar code output data (e.g., the tags in a markup language representation or the key names in a key-value representation) can be used to interpret the user-specified data. For example, the metadata can be used to determine what type of data each data value represents (e.g., in the XML example above, the <zip> tag identifies the data value "95110" as a ZIP code). That determination can then be used to associate the data values with fields in a target system (658).

As an example, in one implementation, the bar code output data includes XML code with tags that organize and describe the individual data entries in the user-specified data. The data entries are extracted from the XML code, and the tags are used to determine to which fields in the target system to assign the data entries.

The target system to which the data from the bar code is transferred can be one of many different types. For example, the target system can be a database, a spreadsheet, or a custom application. Other examples of target systems include enterprise resource planning (ERP) systems, customer relationship management (CRM) systems, and other large-scale enterprise systems.

The target system can also be another electronic form or document. The form in the target system (the target form) can be the same as the source form, in which case the data can be assigned to the same fields in the target form as in the source form. If the target form is different than the source form, the data may be assigned to fields in the target form that do not correspond directly to fields in the source form.

In some implementations, the data can be processed before being transferred into the target system. For example, the data can be reformatted in order to match the format of the fields in the target system. The data can also be combined (e.g., where multiple fields in the source form correspond to one field in the target system), or separated (e.g., where one field in the source form corresponds to multiple fields in the target system).

Other types of processing are also possible. For example, all of the bar code output data (including the metadata and the user-specified data) can be transformed into a format that is suitable for a target system. As one example, if the bar code output data includes XML code, the XML code can be transformed from one XML language into another XML language through the use of an XSLT (Extensible Stylesheet Language Transformations) processor. This can be especially useful where the target system is an enterprise system whose components communicate using XML—in this scenario, the bar code output data can be transformed by an XSLT processor into an XML language used by the enterprise system, and the transformed data can then be transferred to one of the enterprise system components. The specifications for XSLT, which are set forth by the World Wide Web Consortium (W3C), can be found on W3C's web site at http://www.w3.org/Style/XSL/. In other implementations, the bar code output data can be transformed into other languages (e.g., Hypertext Markup Language or HTML), and of course, in some implementations, it may not be necessary to transform the bar code output data at all—e.g., if the markup representation of the user-specified data that is generated uses an XML language that is recognized by an enterprise system, the bar code output data can be transferred directly to one of the enterprise system components.

As used in this specification, the terms "electronic document" and "electronic form" mean a set of electronic data, including both electronic data stored in a file and electronic data received over a network. An electronic document or form does not necessarily correspond to a file. A document or form may be stored in a portion of a file that holds other documents or forms, in a single file dedicated to the document or form in question, or in a set of coordinated files.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIG. 3 does not require the particular order shown, or sequential order, to achieve desirable results (e.g., the operation to determine whether a bar code is validly configured can be performed at many different places within the overall process). In certain implementations, multitasking and parallel processing may be preferable. Other embodiments are within the scope of the following claims.

What is claimed is:

1. A computer program product, stored on a machine-readable medium, the computer program product comprising instructions operable to cause data processing apparatus to:
    display a list of fields, the fields being included in an electronic document;
    receive user input comprising a selection of one or more selected fields from the list of fields;
    automatically generate information for producing a machine-readable code to be displayed in a representation of the electronic document, the information specifying that the machine-readable code is to be produced using data to be provided for the selected fields; and
    store the information in the electronic document.

2. The computer program product of claim 1, wherein the information comprises a script operable to assemble the data to be provided for the selected fields.

3. The computer program product of claim 2, wherein the script is further operable to generate metadata that provides a self-contained description of the data to be provided for the selected fields.

4. The computer program product of claim 1, wherein the user input further comprises one or more parameters for the machine-readable code, and wherein the information further specifies that the machine-readable code is to be produced according to the parameters for the machine-readable code.

5. The computer program product of claim 4, wherein the parameters for the machine-readable code comprise one or more of:
    a symbology;
    a decode condition; and
    an indication of whether the data to be provided for the selected fields is to be compressed before being encoded into the machine-readable code.

6. The computer program product of claim 4, wherein the instructions are further operable to cause the data processing apparatus to;
    compute a setting for a property of the machine-readable code based on the user input.

7. The computer program product of claim 6, wherein the property for the machine-readable code is an element size.

8. The computer program product of claim 6, wherein the property for the machine-readable code is an overall size.

9. The computer program product of claim 1, wherein the instructions are further operable to cause the data processing apparatus to:
    determine whether the user input produces a valid configuration for the machine-readable code.

10. The computer program product of claim 9, wherein the instructions to determine whether the user input produces a valid configuration for the machine-readable code comprise instructions to:
    calculate a total data amount associated with the selected fields based on metadata describing the selected fields; and
    determine whether the total data amount exceeds a maximum data amount associated with the machine-readable code.

11. The computer program product of claim 10, wherein the metadata comprises a field length associated with each selected field.

12. The computer program product of claim 10, wherein the instructions are further operable to cause the data processing apparatus to:
    display a comparison of the total data amount and the maximum data amount.

13. The computer program product of claim 9, wherein the instructions are further operable to cause the data processing apparatus to:
    display an error indication if the user input does not produce a valid configuration for the machine-readable code.

14. The computer program product of claim 1, wherein the instructions are further operable to cause the data processing apparatus to:
    display the representation of the electronic document; and
    display a first area within the representation of the electronic document, the first area indicating a location where the machine-readable code is to be displayed.

15. The computer program product of claim 14, wherein there is a minimum size associated with the first area.

16. The computer program product of claim 15, wherein the user input further comprises one or more parameters for the machine-readable code, and wherein the minimum size is based on one or more of the parameters for the machine-readable code.

17. The computer program product of claim 15, wherein the minimum size includes a boundary area around the machine-readable code to be produced.

18. A computer-implemented method comprising:
displaying a list of fields, the fields being included in an electronic document;
receiving user input comprising a selection at one or more selected fields from the list of fields;
automatically generating information for producing a machine-readable code to be displayed in a representation of the electronic document, the information specifying that the machine-readable code is to be produced using data to be provided for the selected fields; and
storing the information in the electronic document.

19. A system comprising:
means for displaying a list of fields, the fields being included in an electronic document;
means for receiving user input comprising a selection of one or more selected fields from the list of fields;
means for automatically generating information for producing a machine-readable code to be displayed in a representation of the electronic document, the information specifying that the machine-readable code is to be produced using data to be provided for the selected fields; and
means for storing the information in the electronic document.

20. A computer program product, stored on a machine-readable medium, the computer program product comprising instructions operable to cause data processing apparatus to:
receive an electronic document, the electronic document comprising:
a set of fields;
information for producing a machine-readable code to be displayed in a representation of the electronic document, the information specifying that the machine-readable code is to be produced using data to be provided for one or more selected fields from the set of fields; and
a first area for displaying the machine-readable code to be produced;
receive a specification of a first modification to the electronic document; and
evaluate the first modification to determine whether the first modification produces a valid configuration for the machine-readable code.

21. The computer program product of claim 20, wherein the instructions are further operable to cause the data processing apparatus to:
display an alternative modification.

22. The computer program product of claim 21, wherein the first modification comprises a new size for the first area, and wherein the alternative modification comprises a preconfigured size that approximates the new size.

23. The computer program product of claim 20, wherein the instructions are further operable to cause the data processing apparatus to:
display an additional modification, the additional modification being linked to the first modification in a predetermined relationship.

24. The computer program product of claim 23, wherein the first modification comprises a new size for a first edge of the first area, and the additional modification comprises a new size for a second edge of the first area.

25. The computer program product of claim 20, wherein the first modification comprises a new size for the first area, and wherein the instructions to evaluate the first modification comprise instructions to determine whether the new size complies with one or more size constraints.

26. The computer program product of claim 25, wherein the size constraints comprise one or more of:
a minimum size associated with the first area,
a maximum size associated with the first area;
an aspect ratio associated with the first area;
a dimension that is an integral number of times an element dimension; and
a page size associated with the electronic document.

27. The computer program product of claim 20, wherein:
the electronic document comprises one or more items that are independently positionable of the first area;
the first modification comprises a repositioning of the first area or one or more of the items; and
the instructions to evaluate the first modification comprise instructions to determine whether one or more of the items overlaps a boundary area in the first area.

28. The computer program product of claim 20, wherein the first modification comprises a new field length associated with one of the selected fields, and wherein the instructions to evaluate the first modification comprise instructions to;
calculate a total data amount associated with the selected fields based on the new field length; and
determine whether the total data amount exceeds a maximum data amount associated with the machine-readable code.

29. The computer program product of claim 20, wherein the first modification comprises an identification of an additional selected field, the additional selected field having an associated field length, and wherein the instructions to evaluate the first modification comprise instructions to:
calculate a total data amount associated with the selected fields based on the field length associated with the additional selected field; and
determine whether the total data amount exceeds a maximum data amount associated with the machine-readable code.

30. The computer program product of claim 29, wherein the instructions are further operable to cause the data processing apparatus to:
display a comparison of the total data amount and the maximum data amount.

31. The computer program product of claim 20, wherein the instructions are further operable to cause the data processing apparatus to:
receive input data for one or more of the selected fields;
calculate a total data amount associated with the input data; and
determine whether the total data amount exceeds a maximum data amount associated with the machine-readable code.

32. The computer program product of claim 31, wherein the instructions are further operable to cause the data processing apparatus to:
if the total data amount exceeds the maximum data amount, display an indication of by how much the total data amount exceeds the maximum data amount.

33. A computer-implemented method comprising:
receiving an electronic document, the electronic document comprising;

a set of fields;

information for producing a machine-readable code to be displayed in a representation of the electronic document, the information specifying that the machine-readable code is to be produced using data to be provided for one or more selected fields from the set of fields; and a first area for displaying the machine-readable code to be produced;

receiving a specification of a first modification to the electronic document; and evaluating the first modification to determine whether the first modification produces a valid configuration for the machine-readable code.

34. A system comprising:

means for receiving an electronic document, the electronic document comprising:

a set of fields;

information for producing a machine-readable code to be displayed in a representation of the electronic document, the information specifying that the machine-readable code is to be produced using data to be provided for one or more selected fields from the set of fields; and a first area for displaying the machine-readable code to be produced;

means for receiving a specification of a first modification to the electronic document; and means for evaluating the first modification to determine whether the first modification produces a valid configuration for the machine-readable code.

* * * * *

UNITED STATES PATENT AND TRADEMARK OFFICE
CERTIFICATE OF CORRECTION

PATENT NO. : 7,240,841 B2 Page 1 of 1
APPLICATION NO. : 10/868693
DATED : July 10, 2007
INVENTOR(S) : Yohko A. Kelley, Kenneth E. Feuerman and James Lester It is certified that error appears in the above-identified patent and that said Letters Patent is hereby corrected as shown below:

In column 23, line 12, please delete "at" and insert --of-- therefore.

Signed and Sealed this

Twenty-fifth Day of December, 2007

JON W. DUDAS
*Director of the United States Patent and Trademark Office*